United States Patent [19]

Atkins et al.

[11] Patent Number: 5,021,072
[45] Date of Patent: Jun. 4, 1991

[54] METHOD FOR MAKING A CARBON-COATED AND POLYMER-COATED OPTICAL FIBER

[75] Inventors: Robert M. Atkins, Millington; George E. Peterson, Warren; Raymond D. Tuminaro, Livingston, all of N.J.

[73] Assignee: AT&T Bell Laboratories, Murray Hill, N.J.

[21] Appl. No.: 465,698

[22] Filed: Jan. 16, 1990

[51] Int. Cl.[5] .............................. C03B 37/027
[52] U.S. Cl. ...................... 65/3.11; 65/3.43; 65/60.2; 65/60.6; 427/45.1
[58] Field of Search ............ 65/3.11, 3.4, 3.43, 65/3.44, 3.3, 60.2, 60.3; 427/45.1, 46, 163

[56] References Cited

U.S. PATENT DOCUMENTS

| | | | |
|---|---|---|---|
| 3,980,390 | 9/1976 | Yamamoto et al. | 350/96 |
| 4,105,284 | 8/1978 | Olshansky | 350/96 |
| 4,114,981 | 9/1978 | Ishida et al. | 350/96.33 |
| 4,213,672 | 7/1980 | Aulich et al. | 350/96.23 |
| 4,306,897 | 12/1981 | Maklad | 427/45.1 |
| 4,334,733 | 6/1982 | Takeshima et al. | 350/96.33 |
| 4,407,561 | 10/1983 | Wysocki | 65/3.3 |
| 4,560,579 | 12/1985 | Siadat | 427/45.1 |
| 4,600,422 | 7/1986 | Scott | 65/3.3 |
| 4,694,586 | 9/1987 | Reznik | 427/45.1 |
| 4,772,302 | 9/1988 | Abe | 65/3.11 |

FOREIGN PATENT DOCUMENTS

| | | | |
|---|---|---|---|
| 51-67309 | 6/1976 | Japan | 65/18.1 |
| 57-146204 | 9/1982 | Japan | 65/3.43 |

OTHER PUBLICATIONS

"Optical-Fiber Packaging and Its Influence on Fiber Straightness and Loss", *The Bell System Technical Journal*, vol. 54, No. 2, Feb. 1975, pp. 245-262, D. Gloge.

"Nylon-Jacketed Optical Fibre with Silicon Buffer Layer", *Electronics Letters*, vol. 13, No. 6, Mar. 17, 1977, pp. 153-154, T. Naruse et al.

*Primary Examiner*—Kenneth M. Schor
*Attorney, Agent, or Firm*—Oleg E. Alber

[57] ABSTRACT

A process for manufacturing an optical fiber includes the steps of heating and drawing material from a hot optical fiber preform; depositing a conductive coating (especially carbon) on the moving optical fiber; putting a heat curable liquid material on the moving optical fiber; and curing the heat curable liquid material by inductively heating the conductive coating on the moving optical fiber in an electromagnetic field. Heat induced into the conductive coating by energy from the field is conducted from the conductive coating to the heat curable material. The optical fiber continuously moves through the steps of the process without any physical contact.

3 Claims, 6 Drawing Sheets

METHOD FOR MAKING A CARBON-COATED AND POLYMER-COATED OPTICAL FIBER

This invention relates to a method used for making an optical fiber.

BACKGROUND OF THE INVENTION

Performance characteristics of optical fibers can be degraded by environmental elements. For example, the interaction of water with the surface of a silica fiber produces surface modifications which can reduce the strength of the fiber. Any small flaws on the surface can reduce the strength of the fiber and provide a site for moisture-induced stress-corrosion crack growth, which can lead to ultimate fiber failure. Also over a period of time, hydrogen, which can be present at the fiber surface at levels orders of magnitude higher than those found in the atmosphere, can diffuse into an optical fiber and increase the optical loss in a signal carried by that optical fiber.

In order to prevent such interactions, a hermetic coating is applied to the fiber for preventing deleterious environmental elements (typically, water and/or hydrogen) from interacting with the fiber. Such a coating acts as an impermeable hermetic barrier between the fiber and the environment. One such coating, e.g., a carbon coating, is applied under stable ambient conditions to the outer surface of a silica cladding of the fiber by inducing decomposition of a suitable carbon containing organic precursor gas, e.g., acetylene, to form a thin carbon film on the fiber surface, as described by F. V. DiMarcello et al., in a U.S. patent application, Ser. No. 098,253, filed Sept. 18, 1987. Thickness of the carbon coating being applied to the fiber is measured by moving the optical fiber through an electromagnetic field so that the conductive carbon coating interacts with the electromagnetic field, as described by R. M. Atkins et al., in a U.S. patent application, Ser. No. 387,261, filed July 31, 1989, and incorporated herein by reference. The optical fiber thereafter typically is passed through an ultraviolet light curable liquid material and an ultraviolet light for transforming the material into a solid polymeric jacket on the optical fiber.

Fibers processed as described above are sometimes performance-limited in certain applications because ultraviolet light curable polymers typically breakdown at temperatures which are too low for some high temperature environments.

Alternative polymeric materials are a group of heat-curable polymers, which typically break down at temperatures high enough for many high temperature environments. In the prior art, such heat-curable polymers are heated by moving the heat-curable liquid, coated on the optical fiber, through an oven. The heat-curable liquid is heated by convection from the hot air in the oven. Under conditions of rapid heating, the polymer starts cross-linking, or cures, starting at the surface nearest the source of heat, and a film forms on the outer surface of the polymer coating. Continued heating causes bubbles to form in the remaining liquid material due to (1) thermal driven release of dissolved gases, (2) volatilization of components comprising the resin, or (3) volumetric changes in the coating material brought about by the thermally driven cross-linking activity. When the heating is rapid, those bubbles are trapped in the polymer because of the solid film which initially formed on the outer surface of the polymer and the inner surface being blocked by the cladding of the optical fiber. As more of the liquid material cross-links, the bubbles are permanently trapped in the solid polymer forming undesirable defects in the desired solid polymeric coating and causing increased microbending loss and/or a reduction of reliability due to reduced coverage of the silica.

SUMMARY OF THE INVENTION

These and other problems are solved by a new manufacturing process for making an optical fiber. This manufacturing process includes the steps of: heating and drawing material from an optical fiber preform into an elongated moving optical fiber, coating the optical fiber with a conductive material, depositing a heat-curable liquid material on the optical fiber over the electrically conductive material; inductively heating the electrically conductive material on the optical fiber by way of an electromagnetic field; and thermally conductively transferring heat from the electrically conductive coating to the heat-curable liquid material for transforming it into a polymeric solid.

The following advantages are achieved by the foregoing method. The optical fiber continuously moves through the process without any physical contact. By induction, heat is directly transferred to the conductive carbon coating. From the electrically conductive coating, heat also is quickly transferred by thermal conduction from the electrically conductive coating into the heat-curable liquid material.

The general principles of inductive heating described herein can be utilized over a wide range of radio frequencies, typically from about 10 MHz to 150 GHz, and can be applied to a wide election of heat-curable polymers and thicknesses by appropriately selecting a frequency range and equipment that is compatible with the selected frequency range.

BRIEF DESCRIPTION OF THE DRAWING

A better understanding of the invention may be derived by reading the subsequent detailed description thereof with reference to the attached drawing wherein.

DETAILED DESCRIPTION

Figure 1:
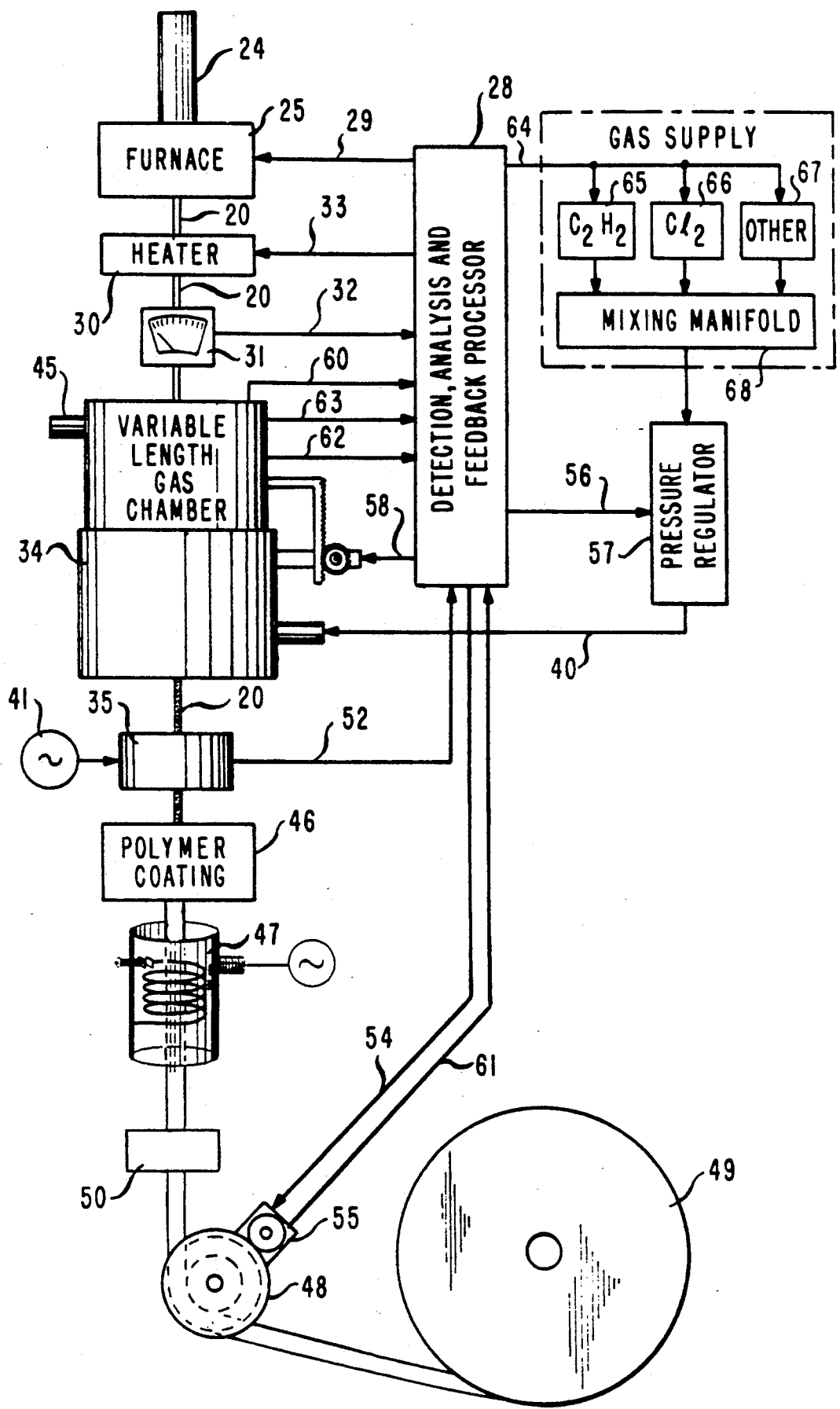
FIG. 1 is a schematic diagram of an arrangement for drawing an optical fiber and of apparatus for controlling the drawing operation and the coating process.

Referring now to FIG. 1, there is shown a diagram of exemplary apparatus for drawing an optical fiber 20 from a preform 24. The preform may include silica glass with predetermined dopants which will form an optical fiber having a low loss optical core section that is surrounded by a cladding section. The core and cladding sections have different indices of refraction so that light transmitted axially along the core is retained within the core because of internal reflections and/or confinement which occur due to the stratification of the refractive indices.

A furnace 25 surrounds at least the lower end of the preform 24 and heats that end to its melting or softening temperature. The fiber 20 is drawn from the end of the preform 24 at a velocity, or rate, that is known to produce the elongated fiber 20 with a predetermined diameter. Generally the fiber is drawn from the preform at a controlled steady temperature and velocity.

During the drawing operation, the fiber 20 moves through an optional heater 30 for supplementing the residual heat in the fiber 20, if desired, and passes a thermometer, or pyrometer, 31 for monitoring the temperature of the fiber 20. Temperature measured by the thermometer 31 is applied through a lead 32 to a detection, analysis and feedback processor 28, which produces a signal on a lead 33 for controlling the temperature of the heater 30. In a chamber 34, an exemplary mixture of acetylene precursor gas together with chlorine (in molecular or compound form) and an inert gas, such as nitrogen, argon, or helium, is applied to the hot moving silica surface of the fiber 20 for pyrolyzing, or inducing decomposition of the acetylene precursor gas, and depositing a carbon coating uniformly around the periphery of the fiber. Chlorine is used as a getter for free hydrogen. The carbon coating deposition process occurs in controlled ambient conditions, which typically are constant. While the fiber is moving and without it contacting any apparatus, the thickness of the carbon coating is controlled continuously within tolerances to effectively hermetically seal the regions within the outer diameter of the cladding of the optical fiber 20 from any subsequent contact with either water or hydrogen during fabrication, installation, or use of the fiber in a transmission system. At the same time, vulnerability of the carbon coating to cracking under tensile load due to excessive carbon coating thickness is limited to maintain an acceptable level of fiber strength.

Figure 2:
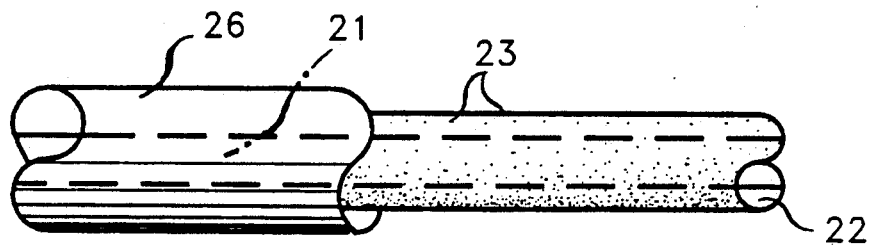
FIG. 2 is a diagram of a section of optical fiber coated with a carbon coating.

Referring now to FIG. 2, there is shown a diagram of the optical fiber 20 including a center core 21 and cladding 22. Although not shown in FIG. 2, there may be more silica layers in the core and cladding regions of the optical fiber. Also shown in FIG. 2, there are a thin layer of carbon 23, as represented by dots overall, and a solid polymeric jacket 26.

After the carbon coating is applied to the moving fiber 20 of FIG. 1, the coated fiber moves on through a radio frequency cavity 35 for measuring the thickness of the carbon coating. Radio frequency is an electromagnetic wave frequency intermediate between audio frequency and infrared frequency. Upon exiting from the radio frequency cavity 35, the fiber 20 moves on through one or more vessels 46 which are filled with heat-curable liquid materials that are subsequently transformed into polymeric solids for coating the fiber 20 to protect its surface from future mechanical damage resulting from incidental or accidental contact. This transformation to the polymeric solid is made by exposing the optical fiber to another electromagnetic field produced by a radio frequency helically wound transmission line 47, a travelling waveguide transmission line, or a waveguide resonant cavity. The polymer is quickly heated to a desired temperature by the transmission line 47 and can optionally be held at the elevated temperature in a convection oven 50. Once the polymeric coating is formed and cured on the fiber 20, it is wound about a capstan drive 48 and then onto a reel 49 for storage and for convenience of handling until the fiber is installed in a transmission system. Speed of the capstan drive 48 and of the fiber are sent to the processor 28 via a lead 61.

Two exemplary subsystems control the previously described optical fiber drawing operation. Controlling fiber diameter by operation of the furnace and the drawing speed are described in detail in a textbook, entitled "Optical Fiber Telecommunications" edited by S. E. Miller et al., Academic Press, Inc., 1979, pp. 263-298. Such text is incorporated herein by reference.

Another control system measures and controls the thickness of the carbon coating that is applied to the surface of the moving optical fiber 20 without physically contacting the fiber without the polymer coating. This method for measuring and controlling the thickness of the carbon coating is described in detail in the previously mentioned, copending U.S. patent application, Ser. No. 387,261.

Figure 3:
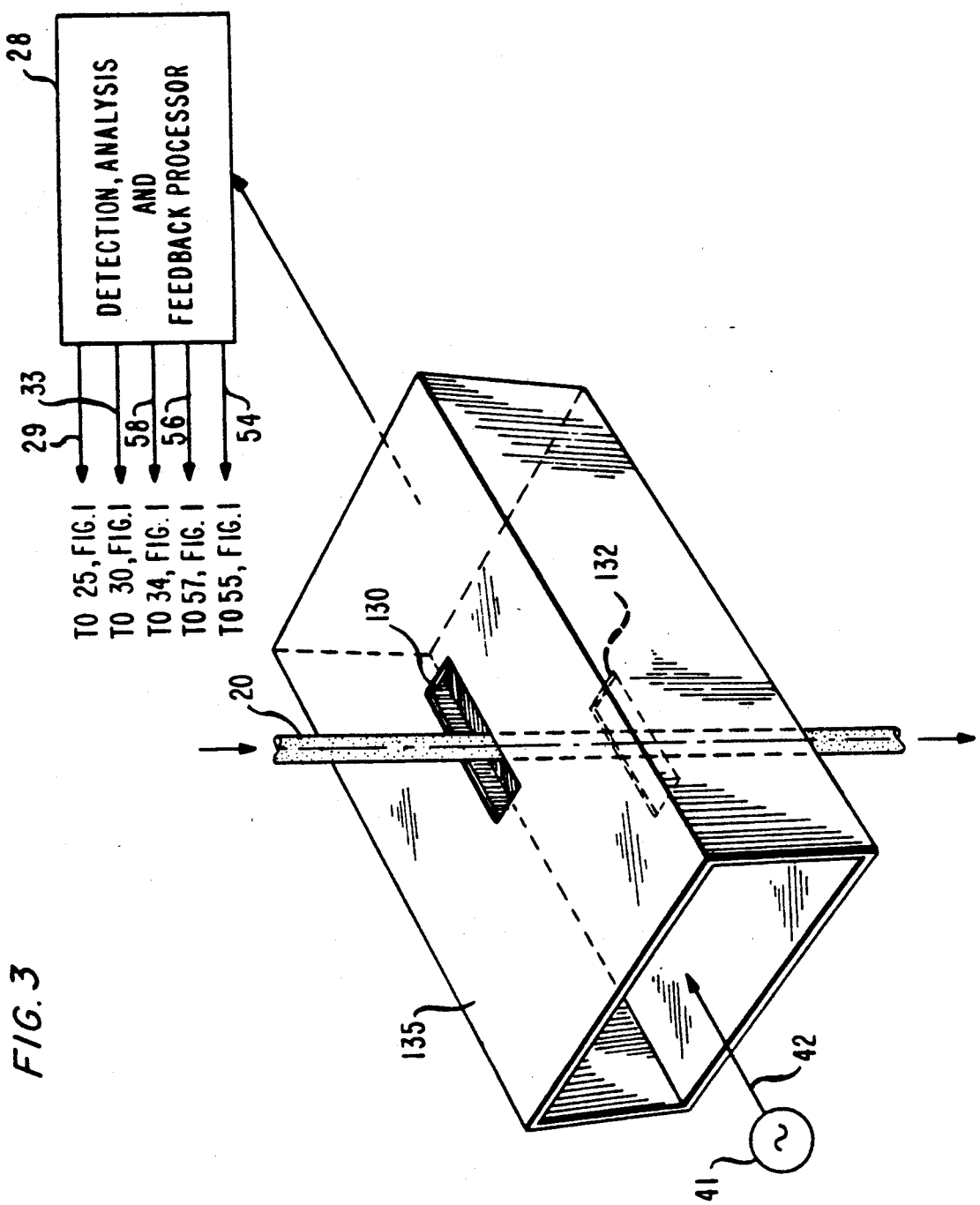
FIG. 3 is a diagram of a section of waveguide cavity used in a carbon coating thickness measurement process.

Referring now to FIG. 3, there is shown the carbon coated optical fiber 20 moving through longitudinal slots 130 and 132 in a section of waveguide 135, being used as the cavity 35 of FIG. 1. From the source 41 and the line 42 of FIG. 3, the waveguide in this example is energized with a propagating electromagnetic field. Slots 130 and 132 are cut along the centerlines of opposite broad faces of the section of waveguide. The slots should be as narrow as reasonably possible consistent with the fiber never contacting the slot boundaries.

For convenience in obtaining parts and the actual sizes of those parts, a section of WR90 waveguide and a klystron oscillating at 10.5 GHz were chosen for the arrangement. A crystal diode is used for the detector at the output end of the waveguide 135. Matching sections are used for connecting the klystron and the detector to the section of waveguide. At low incident power levels, e.g., less than 100 microwatts, the output current of the detector is proportional to the square of the electric field in the waveguide. That output current is proportional to output power. The foregoing specific items and parameters are mentioned by way of example. Other sizes, electromagnetic energy exciters, frequencies, and power levels also are useful.

As previously mentioned, the input signal, applied by the klystron in FIG. 3, creates a propagating electromagnetic field in the section of waveguide. In the unlikely event that the arrangement is perfectly matched, the magnitude of the time averaged vertical electric field is constant along the entire axis of the section of waveguide 135 in the absence of the coated fiber. In that case the position of the fiber along the slot is not important. In the more likely event that the arrangement is mismatched, there are standing waves present and at least a partially resonant condition in the section of waveguide 135. In the mismatched arrangement, there are positions of greater electric field strength where more power is absorbed by the conductive coating. A deliberate mismatch can be created by tuning screws and/or irises in the waveguide. In this mismatched case, the fiber is deliberately located in a longitudinal position coincident with an electric field maximum which corresponds to a minimum longitudinal field gradient.

When the fiber 20, with the conductive carbon coating, moves through the waveguide, the conductive coating interacts with the electric field component. Transmitted power is reduced by the creation of an alternating current in the carbon coating. The amount of power lost is a function of the conductance of the carbon coating on the fiber. For a uniform outside diameter optical fiber, conductance of the carbon coating depends upon the conductivity of the carbon and the carbon coating thickness, which is a variable.

Thus depending upon the variable thickness of the carbon coating, the detection, analysis, and feedback processor 28 will measure a variable transmission loss for a constant input signal power at a given frequency.

Figure 4:
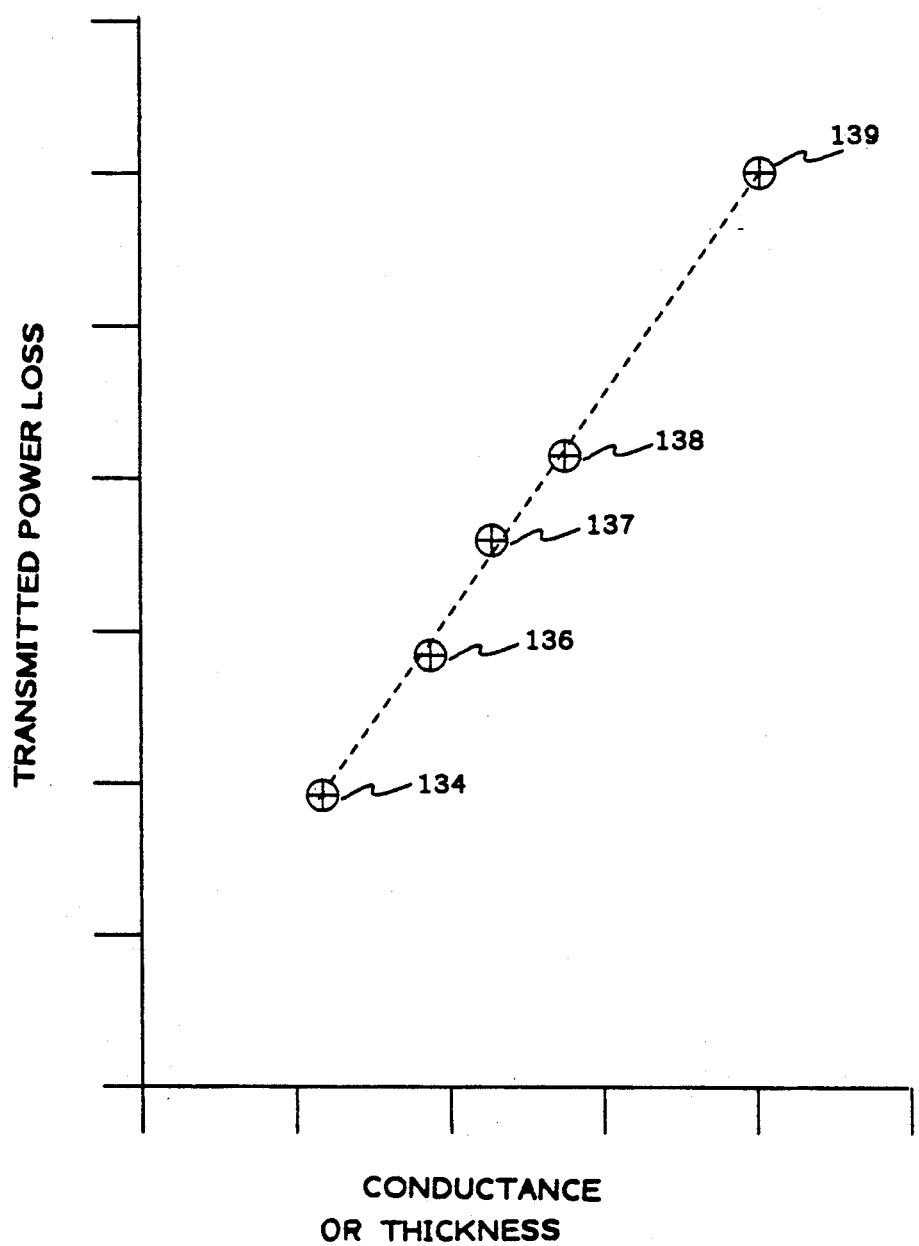
FIG. 4 is a graph of transmitted power loss versus the thickness of a conductive coating.

FIG. 4 shows the result of measurements 134, 136, 137, 138 and 139 of transmitted power loss versus conductance or thickness of some practical examples of carbon coatings.

Control of the process for coating the optical fiber, as performed by the apparatus presented in FIG. 1, is achieved by sensing and adjusting one or more of the following four process parameters: (1) the temperature of the fiber entering the precursor gas chamber; (2) in the precursor gas chamber, the concentration of the acetylene gas including the carbon atoms to be deposited; (3) the acetylene gas pressure in the precursor gas chamber; and (4) the time duration of exposure of the hot fiber to the acetylene gas in the chamber. Upon close analysis, other arrangements—which: (1) move the position of the precursor gas chamber; (2) change the length of the precursor gas chamber; (3) change the mixture of the gases; (4) vary the speed of the fiber draw; or (5) alter the temperature of the furnace—fundamentally alter one or more of the four described parameters of the manufacturing process.

Once the uniformly thick conductive carbon coating is in place, the optical fiber moves on through the vessel 46 of FIG. 1 for applying the heat-curable polymer coating. Such polymers are heat setting polymers that initially are relatively low viscosity materials at room temperature. These polymers establish a network structure that is cured or cross-linked into a solid polymer upon application of heat. Typically curing commences within the liquid material at the heat source and proceeds through the material in a direction away from the heat source.

Figure 5:
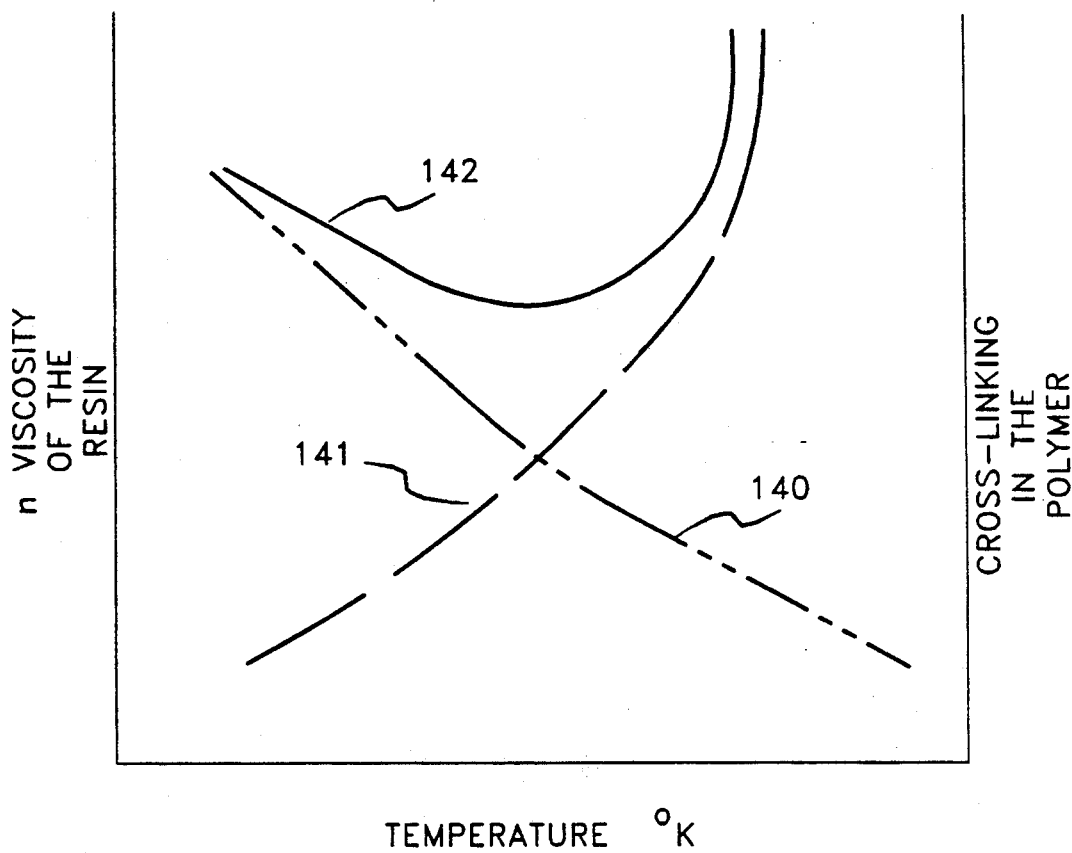
FIG. 5 is a graph representing the viscosity of a heat-curable polymer with reference to both temperature and the cross-linking of molecules.

Referring now to FIG. 5, three graphs are plotted to represent the dynamics of curing a heat curable polymer. The thickness of the polymer and the rate of curing depends upon more than one parameter. Curve 140 represents the viscosity versus temperature of a typical resin in its uncured state. Viscosity is a physical property of a fluid or semifluid, which enables it to develop and maintain an amount of shearing stress dependent upon the velocity of flow and to offer continued resistance to flow. Viscosity, as read on the lefthand axis, is high for the precured resin at low temperatures and falls with increasing temperature. Curve 141 represents the effect of cross-linking in a resin. As temperature rises, cross-linking increases and therefore viscosity also increases, ultimately transforming the resin into a solid. Curve 142 represents an indication of the overall effect of curves 140 and 141. Viscosity decreases with temperatures rising from low temperatures while temperature effects prevail over cross-linking effects. When cross-linking becomes more prevalent at higher temperatures, viscosity rises with continuing increases in temperature until the material solidifies into the polymer.

Figure 6:
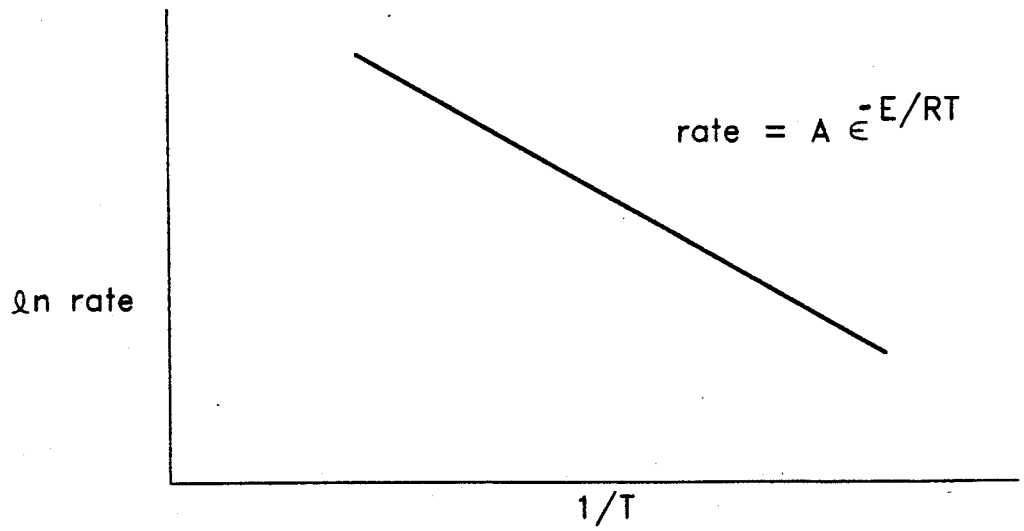
FIG. 6 is a graph of the logarithm of the rate of the cross-linking with respect to the inverse of temperature.

Referring now to FIG. 6, there is shown an exemplary rate curve. Curing speeds up with rising temperatures. Polymers can cure at low temperatures, but at low temperatures more time is required to complete the curing process. Heat curable polymers include materials such as epoxies, polyesters, polymides, cyanate, esters, and siloxanes.

To insure rapid curing at high temperatures without first curing (or solidifying) the outer surface of the polymer and thereby entrapping bubbles, we have developed a new way to heat the liquid material for curing it.

Figure 7:
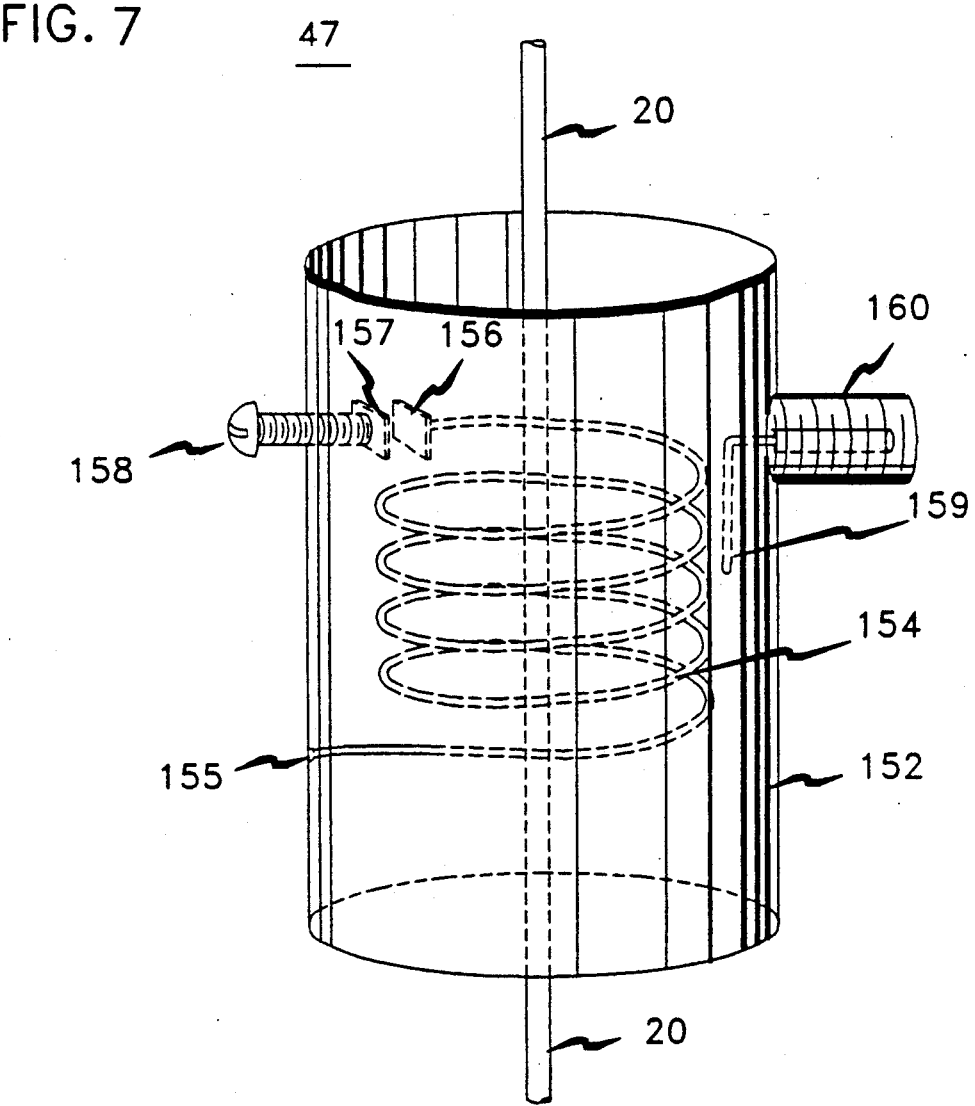
FIG. 7 is a schematic diagram of an illustrative apparatus for heat curing a polymer coating on an optical fiber by inductively heating a conductive coating between the optical fiber and the heat-curable polymer.

Referring now to FIG. 7, there is shown a short section of a helically wound transmission line, or a high Q quarter wave helical coil resonator 47. An outer copper shield 152 of a round cross-section coaxial arrangement, having an area of approximately 6.5 $cm^2$ surrounds a helically wound inner conductor 154. One end of the helically wound conductor 154 is bonded to the outer copper shield 152 at a bonding point 155. The opposite end of the helically wound conductor 154 is suspended in air with a small capacitor plate 156 affixed thereto. Another facing capacitor plate 157 is affixed to an adjustment screw 158 for tuning the transmission line 47 to resonance. A capacitive probe 159 receives energy by way of a coaxial connector 160. The polymer coated optical fiber 20 moves along the center axis of the helically wound conductor 154 to be heated. Such energy, when provided in the radio frequency range of frequencies, constrains the sizes of the parts of the helically wound transmission line 47 to convenient sizes.

An exemplary helically wound transmission line 47 has been designed for operating at a frequency of approximately 400 MHz. The helix of the exemplary helically wound conductor has 3.5 turns of copper wire with a helix outside diameter of approximately 1.27 cm and a 0.63 cm pitch.

Radio frequency power at a level in a range of 1–150 watts is applied to the input coaxial connector 160. A level of power in that range has been determined to be adequate to inductively heat the conductive carbon coating on the fiber while the fiber is moving through the transmission line 47 during the optical fiber fabrication process.

Depending upon the speed the optical fiber production process, the desired polymer curing the temperature, and the time required to cure the polymer, more than one of the transmission lines 47 can be positioned in tandem for inductively heating the conductive carbon coating.

Such inductive heating of the carbon coating heats the carbon coating very quickly. In turn, heat from the carbon coating is thermally conducted quickly into the heat curable liquid material from its inner surface. Curing of the polymer occurs very rapidly commencing with the inner surface adjacent to the carbon coating and moving away toward the outer surface of the polymer. Since the curing commences at the inner surface of the polymer, any bubbles diffuse to the outer surface of the liquid material and escape before the liquid material is cured into a solid polymer. Thus the polymer is cured rapidly from its inner surface toward the outer surface without trapping bubbles, leaving the solid polymer coating free of defects.

Alternative methods for induction heating of the fiber include the use of various forms of waveguide cavity resonators. These resonators can be operated at a variety of radio frequencies. The choice of frequency is typically governed by a variety of factors, for example, commercial availability of equipment, size, and, very importantly, the loss tangent properties of the resin that is applied over the cladding of the fiber. In reference to this latter situation, heat will be developed in the polymeric coating due to (1) thermal conduction via the radio frequency heating of the carbon layer and (2) loss tangent dissipation in the polymer. With dual mechanisms for heat generation, the microwave frequency may be chosen so that the loss tangent is sufficiently high that direct microwave heating of the resin assists the curing process.

Thus there has been described a method for making an optical fiber by depositing the carbon coating on the moving optical fiber and curing a polymeric coating over the carbon coating by inductive heating. The apparatus for performing this method for making and coating the fiber do not contact the fiber during the manufacturing operation. The described method together with other methods made obvious in view thereof are considered to be covered by the appended claims.

What is claimed is:

1. A process for making an optical fiber comprising a core and cladding, a hermetic coating on the cladding surface of the optical fiber, and an organic coating layer over the hermetic coating, the process comprising the following steps:

heating at least an end portion of a cylindrical optical fiber perform having a core and cladding and drawing material from the heated portion of the optical fiber preform into an elongated moving optical fiber comprising a core and a cladding;

coating the entire circumference of the cladding surface of the moving optical fiber with a continuous layer of carbon, said carbon layer being thick enough to effectively hermetically seal the optical fiber and, yet, thin enough to avoid vulnerability of the carbon coating to cracking which could lead to a reduction in the strength of the fiber;

depositing a heat-curable polymeric liquid material on the entire circumference of the carbon coating on the optical fiber; and heat-curing the polymer by heating the carbon coating by induction; and curing the polymeric material by conduction of heat from the carbon coating whereby an inside-out curing occurs and any bubbles forming in the polymer via the thermal process are driven toward the outer surface and do escape from the outer surface of the polymer coating prior to the transformation of the outer surface from a liquid to a solid state.

2. A process for making an optical fiber, in accordance with claim 1, wherein
the polymer is cured in ten seconds or less.

3. A process for making an optical fiber, in accordance with claim 1, wherein
the carbon coating is heated while it is moved through a plurality of resonant cavities.

* * * * *